UNITED STATES PATENT OFFICE.

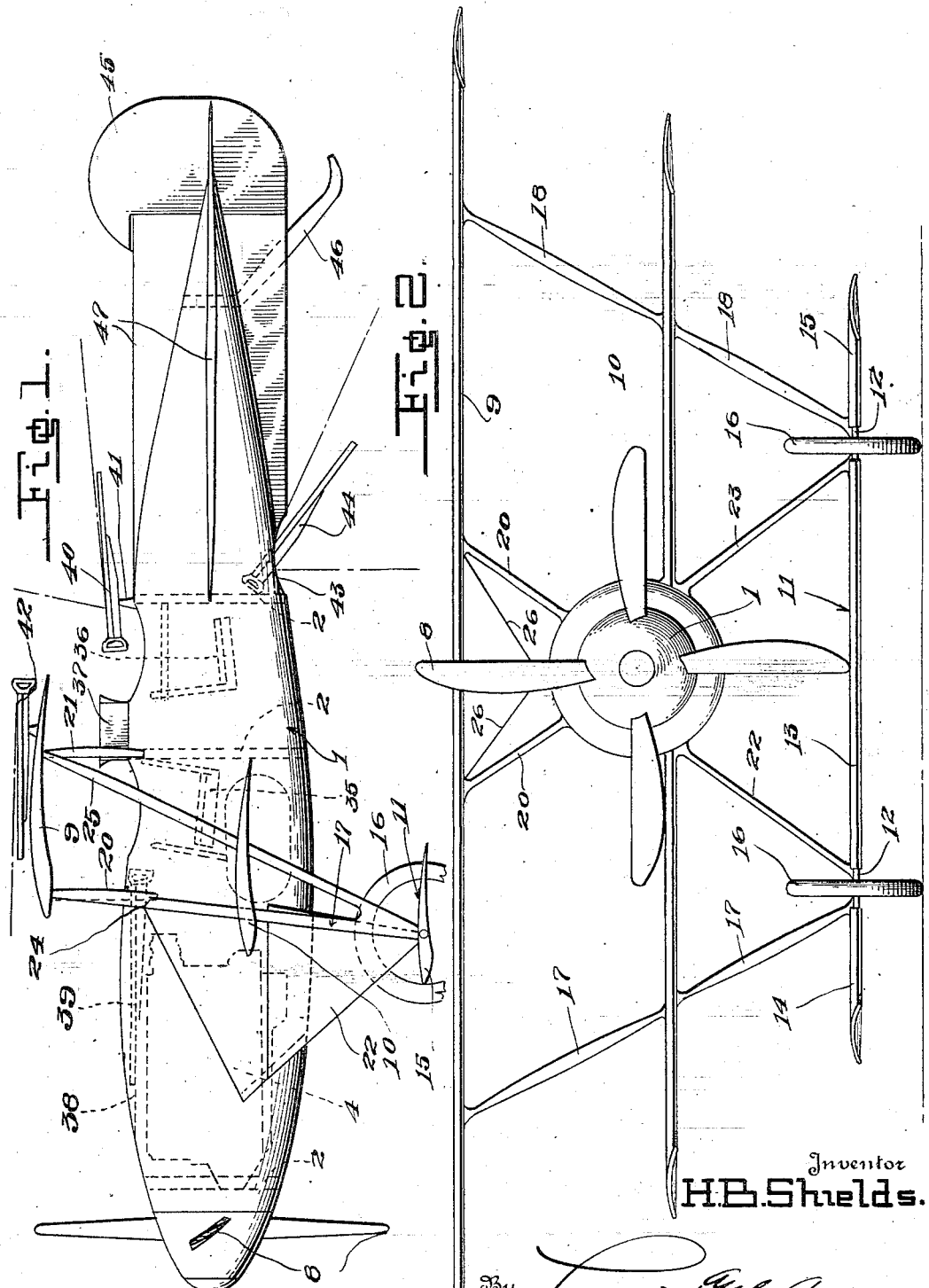

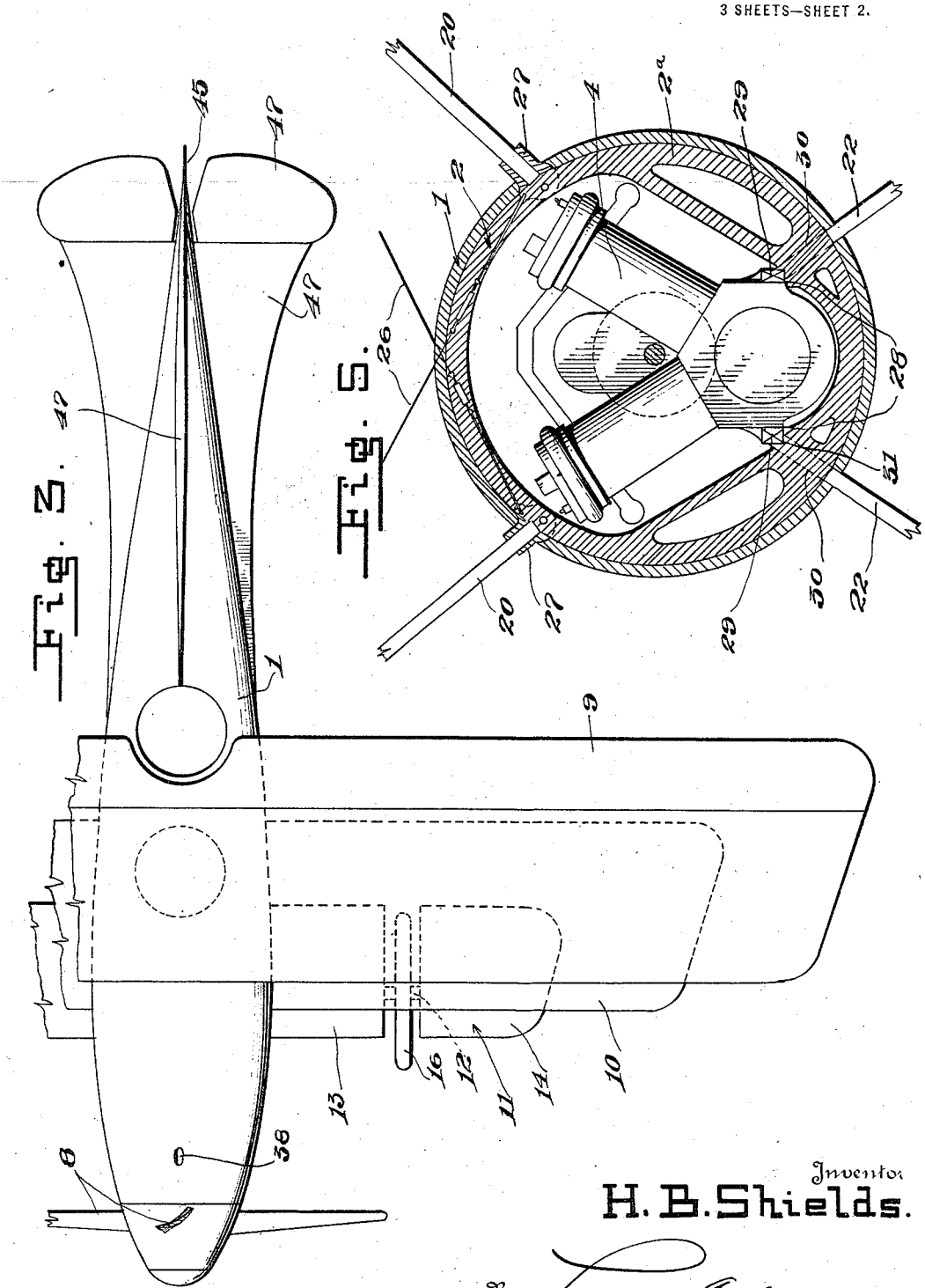

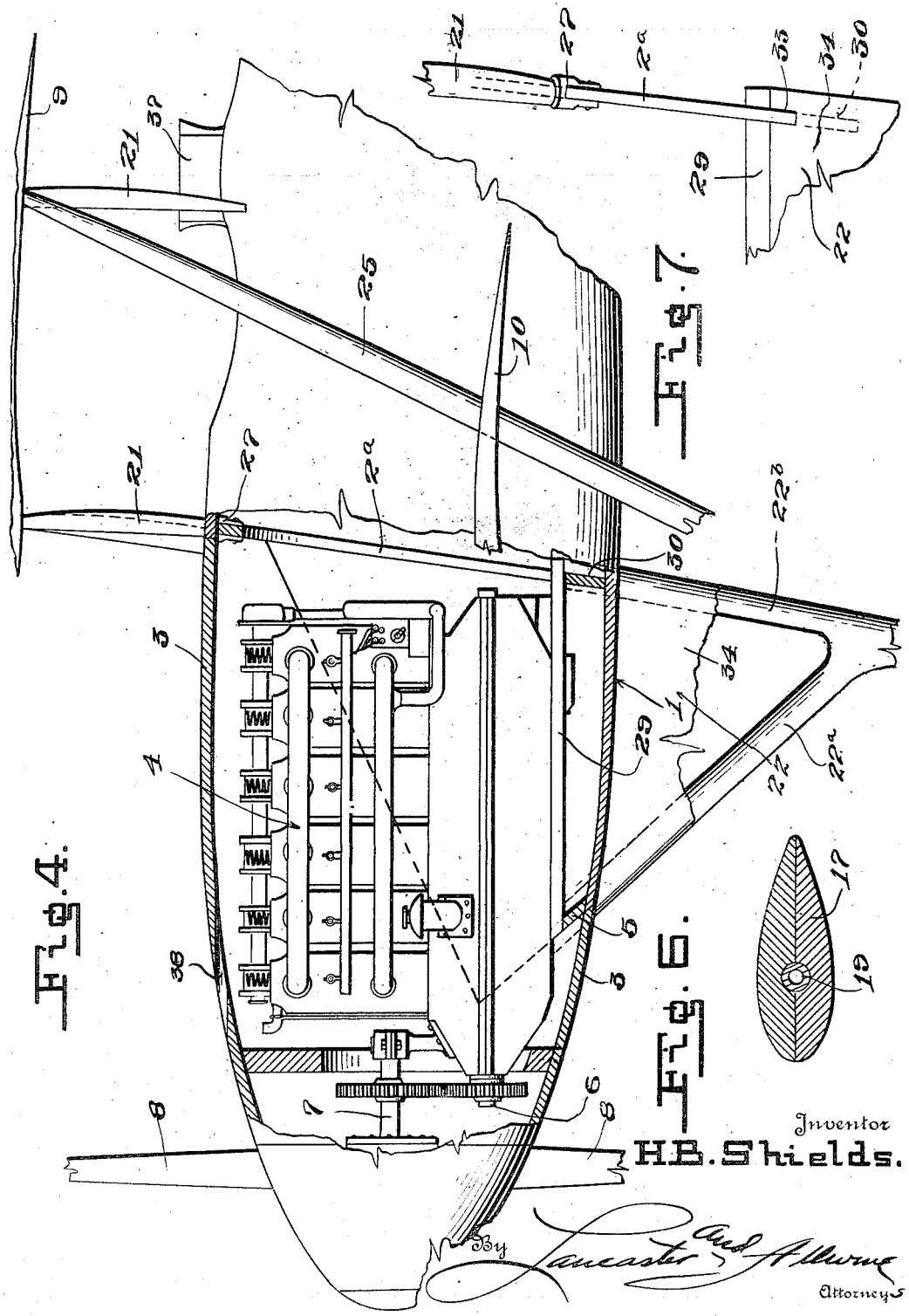

HENRY B. SHIELDS, OF FREEPORT, NEW YORK.

AIRPLANE.

1,383,157. Specification of Letters Patent. Patented June 28, 1921.

Application filed October 30, 1918. Serial No. 260,343.

*To all whom it may concern:*

Be it known that I, HENRY B. SHIELDS, a citizen of the United States, and a resident of Freeport, in the county of Nassau and State of New York, have invented certain new and useful Improvements in Airplanes, of which the following is a specification.

This invention relates to airplanes, and more particularly to a fast tri-plane for scouting or aggressive purposes.

An object of this invention is to provide an airplane in which the aerofoils are braced by a novel form of trussing, comprising a series of triangles, which trusses or struts are built in stream line sections, with a tension member or rod passing through their centers and in such manner as to eliminate the necessity of the employment of guy or bracing rods consequently cutting down the head resistance of the airplane and permitting the same to travel at a greater rate of speed than ordinary planes, upon the utilization of an equal amount of power.

Another object of the invention is to provide a monocoque fuselage which is braced by suitable bulkheads, one of which has the engine supporting rails, supported thereby which rails are further supported by strength members which have the dual function of bracing the aerofoils, and supporting the wheels, as well as assisting in supporting the engine, and to provide a removable cowl which is preferably constructed of aluminum, and is removable to permit access to the interior of the fuselage for repairing or adjusting the engine or motor of the airplane.

Another object of the invention is to provide a special propeller shaft and gearing connecting this propeller shaft to the engine whereby the axis of the propeller will be near the geometrical center of the motor, which will allow the use of a symmetrical and circular fuselage to entirely inclose the motor and still be sufficiently small to have the same fineness ratio and shape as the best stream line bodies.

Other objects of the invention will appear in the following detailed description, taken in connection with the accompanying drawings, forming a part of this specification, and in which drawings:

Figure 1 is a side elevation of the improved airplane.

Fig. 2 is a front elevation of the airplane.

Fig. 3 is a top plan of the airplane having portions of the aerofoils broken away.

Fig. 4 is an enlarged fragmentary view partially in section of the fuselage.

Fig. 5 is a cross section through the fuselage showing one of the bulkhead structures.

Fig. 6 is a cross section through one of the struts.

Fig. 7 is a detail view illustrating the manner of connecting certain of the struts to one of the bulkheads.

Referring more particularly to the drawings, 1 indicates the monocoque fuselage which is preferably built of spiral layers or strips of veneer to form what is commercially known as a monocoque fuselage which is braced at spaced intervals throughout its length by suitable bulkheads 2. The forward end of the fuselage has a removable part or cowl 3 which is constructed of aluminum or other suitable light material and is provided to permit access to the engine or motor 4 used for propelling the airplane. A diagonal bulkhead 5 is provided which supports the beams of the engine or motor 4 and distributes the stresses from certain struts over a large portion of the fuselage, to which it is attached.

The power shaft 6 of the engine is operatively connected, by means of gears and a silent chain, with the propeller carrying shaft 7 which is elevated above the shaft 6 sufficiently to bring the axis of the propeller near the geometrical center of the motor or engine 4 which will allow the use of a symmetrical and circular fuselage to entirely inclose the motor or engine which fuselage will be sufficiently small to have the same fineness ratio and shape as the stream line bodies which have proven best, by aero-dynamical tests. The propeller 8 is of ordinary construction, and is carried by the shaft 7.

The aerofoils 9, 10 and 11 decrease progressively in both span and chord from the uppermost aerofoil 9 to the lowermost aerofoil 11 which latter aerofoil is positioned beneath the fuselage 1 and is braced diagonally by the V struts or braces 22 and 23. The lowermost aerofoil 11 is practically divided into three sections, namely the intermediate section 13 and end sections 14 and 15, the inner ends of which are spaced from the end of the intermediate section 13 sufficient distances to permit the mounting of the landing wheels 16 upon the longitudinal spar or beam 12.

The aerofoils 9, 10, and 11 are braced and supported by diagonal struts 17 and 18 which are attached, at their lower ends to the spar 12 outwardly of the wheels 16 as clearly shown in Fig. 2 of the drawings. These struts are braced or strengthened by longitudinally extending tension rods 19 positioned centrally therein. The struts 17 and 18 are substantially oval in cross section, so as to present stream line surfaces to decrease the head resistance of the airplane, as clearly shown in Fig. 6 of the drawings, and by their particular diagonal arrangement, they, together with the relatively short struts 20 and 21 which brace the top or uppermost aerofoil 9 and the strengthening members 22 and 23 form sufficient braces for the aerofoils, eliminating the necessity of the employment of a plurality of guy wires and also numerous struts as commonly employed in airplane constructions for properly bracing and supporting the various aerofoils. It will be noted, by reference to Fig. 1 of the drawings, that each of the struts or strut structures 17 and 18 comprises a pair of diverging members or struts 24 and 25 which converge at their lower ends or where they are attached to the spar 12 and diverge gradually as they extend upwardly therefrom, being attached to the aerofoils 10 and 9 at spaced positions. These strut sections 24 and 25 are positioned one directly in front of the other.

The struts 20 and 21, extend diagonally from the fuselage 1 to the under surface of the upper aerofoil 9 substantially parallel to the struts 17 and 18 and if it is so desired, these struts, namely the struts 20 and 21 may be braced by cross guy wires 26 which extend through the monocoque fuselage 1 and are connected to the inner ends of the struts at their connections or couplings 27 with the bulkheads 2ª. This bulkhead 2ª extends across the body, rearwardly of the engine or motor 4, and directly behind the strut 24 when viewing the airplane from the side and it has seats 28 formed thereon, which supports the beams 29.

The V struts or braces 22 and 23 are each composed of angularly disposed connected struts 22ª and 22ᵇ which have their lower ends connected and which diverge as they extend upwardly. The upper ends of the struts 22ª are bifurcated or forked, as indicated at 22ᶜ in Figs. 1 and 4 of the drawings, for engagement upon each side of the diagonal bulkhead 5 and the upper ends of the struts 22ᵇ, which ends extend through the monocoque body 1 are also bifurcated, as indicated at 30 for engagement upon each side of the bulkhead 2ª. The intermediate or exposed portions of these V struts or strengthening members 22 and 23 are covered with veneer, as indicated at 34 to cause less resistance. The upper ends of the strengthening members or struts 22ª and 22ᵇ are provided with cut-out portions 31 which engage the beams 29 of the engine or motor structure. The lower ends of the strengthening members are attached to the spar 12 inwardly of the landing wheels 16 and they extend diagonally to the wheels and also the struts 17 and 18, forming a triangular formation of the struts and braces of the various aerofoils. The jars or shocks occasioned by the landing of the airplane are distributed through the spar 12, and braces or strength members 22 and 23, and any upward movement of these strength members, is eliminated by their engagement with the rails 29 of the engine structure as clearly shown in Fig. 5 of the drawings.

The fuselage 1 of the airplane is provided with front and rear cockpits, in which are mounted the operator's and observer's seats shown in dotted lines at 35 and 36, respectively. A head rest 37 is carried by the fuselage between the two cockpits, and against the padded surfaces of which the heads of the operator and observer rest.

The body or fuselage 1 of the airplane is provided with an opening, indicated at 38, through which a machine gun 39 points, so that this machine gun may be fired by the pilot or operator of the airplane between the blades of the propeller. A machine gun 40 is carried by a suitable mount 41 and faces over the tail of the airplane, its angle of fire being indicated by the dot and dash lines. A machine gun 42 is carried upon the upper surface of the top aerofoil 9, and is operated by the observer from the rear cockpit, he standing, when operating this machine gun.

The fuselage 1 is provided with a cut-out portion 43, through the bottom thereof, through which a machine gun 44 projects, and the angle of fire of this gun is indicated by the dot and dash lines. It will be seen, by the particular mounting of the machine guns 39, 40, 42 and 44, that practically all directions from the airplane may be covered. The machine guns 40 and 42 are mounted to swing about arcs of substantially 180°, in horizontal plane while the machine gun 44 may be mounted to swing about an arc transversely to its length, as well as about the vertical arc indicated by the dot and dash lines.

The airplane carries the usual type of rudder 45, landing skid 46 and tail planes or empennages 47.

Changes in details may be made without departing from the spirit of the invention, but;

I claim:

1. In an airplane, the combination, of a fuselage, a plurality of substantially V-shaped struts depending from said fuselage, a spar carried by said struts, an aerofoil built upon said spar in three sections and having the end sections spaced from the intermediate section.

2. In an airplane, the combination, of a fuselage, a plurality of struts depending from said fuselage, a spar carried by the lower ends of said struts, an aerofoil built upon said spar in three sections and having the end sections spaced from the intermediate section, and landing wheels mounted upon said spar between the facing ends of said aerofoil sections.

3. In an airplane, the combination, of a fuselage, a plurality of strength members depending from said fuselage, a spar carried by said strength members, an aerofoil built upon said spar in three sections and having the end sections spaced from the intermediate section, and a plurality of diagonal struts attached to said spar and extending upwardly therefrom, and aerofoils braced by said struts.

4. In an airplane, the combination, of a fuselage, a plurality of strength members depending from said fuselage, a spar carried by said strength members, an aerofoil built upon said spar, an upper aerofoil positioned above said fuselage, an intermediate aerofoil extending laterally from the fuselage, a plurality of diagonal struts attached to said spar and lower aerofoil and extending upwardly therefrom bracing said intermediate and upper aerofoils, and diagonal struts extending upwardly from the fuselage and bracing said upper aerofoil, said strength members, and said first named diagonal struts arranged to form with said intermediate aerofoil, a rigid triangular cell on each side of the fuselage.

5. In an airplane, the combination, of a fuselage, a plurality of substantially V-shaped struts depending from said fuselage, a spar carried by said struts, an aerofoil built upon said spar in three sections and having the end sections spaced from the intermediate section, landing wheels mounted upon said spar between the facing ends of said aerofoil sections, a plurality of diagonal struts attached to said spar and extending upwardly therefrom, and aerofoils braced by said struts.

6. In an airplane, the combination, of a fuselage, a plurality of strength members depending from said fuselage, a spar carried by said strength members, an aerofoil built upon said spar in three sections and having the end sections spaced from the intermediate section, landing wheels mounted upon said spar between the facing ends of said aerofoil sections, an upper aerofoil positioned above said fuselage, an intermediate aerofoil extending laterally from the fuselage, a plurality of diagonal struts attached to said spar and said lower aerofoil and extending upwardly therefrom bracing said intermediate and upper aerofoils, and diagonal struts extending upwardly from the fuselage and bracing said upper aerofoil, said first and second named struts and said strength members arranged to form with said aerofoils and fuselage polygonal cells.

7. In an airplane, a fuselage, a bulkhead within said fuselage, an engine, supporting rails for said engine, said bulkhead provided with seats against which said rails rest, a plurality of strength members depending from said fuselage and extending into the fuselage, the portions of said strength members which extend into said fuselage being notched and engaging said engine rails, a spar carried by the lower ends of said strength members, an aerofoil built upon said spar in three sections and having its end sections spaced from the intermediate section, and landing wheels mounted upon said spar between the facing ends of said aerofoil sections.

8. In an airplane, a fuselage, a bulkhead within said fuselage, an engine, supporting rails for said engine, said bulkhead provided with seats against which said rails rest, a plurality of strength members depending from said fuselage and extending into the fuselage, the portions of said strength members which extend into said fuselage being notched and engaging said engine rails, a spar carried by the lower ends of said strength members, an aerofoil built upon said spar in three sections and having its end sections spaced from the intermediate section, landing wheels mounted upon said spar between the facing ends of said aerofoil sections, an upper aerofoil positioned above said fuselage, an intermediate aerofoil extending laterally from the fuselage, a plurality of diagonal struts attached to said spar and lower aerofoil and extending upwardly therefrom and bracing said intermediate and upper aerofoils.

9. In an airplane, a fuselage, a bulkhead within said fuselage, an engine, supporting rails for said engine, said bulkhead provided with seats against which said rails rest, a plurality of strength members depending from said fuselage and extending into the fuselage, the portions of said strength members which extend into said fuselage being notched and engaging said engine rails, a spar carried by the lower ends of said strength members, an aerofoil built upon said spar in three sections and having its end sections spaced from the intermediate section, landing wheels mounted upon said spar between the facing ends of said aerofoil sections, an upper aerofoil positioned above said fuselage, an intermediate aerofoil extending laterally from the fuselage, a plurality of diagonal struts attached to said spar and lower aerofoil and extending upwardly therefrom and bracing said intermediate and upper aerofoils, and diagonal struts extending upwardly from the fuselage and bracing said upper aerofoil, said first and second named struts and said strength members arranged to form with said aerofoils and fuselage polygonal cells.

10. In an airplane, the combination, of a fuselage a plurality of strength members depending from said fuselage, a spar carried by said strength members, an aerofoil built upon said spar in three sections and having the end sections spaced from the intermediate section, landing wheels mounted upon said spar between the facing ends of said aerofoil sections and outside the lower end of said strength members, a plurality of diagonal struts attached to said spar and extending upwardly therefrom, an aerofoil extending laterally from each side of the fuselage and supported at a distance from said fuselage by upper ends of said diagonal struts, an aerofoil positioned above said fuselage, diagonal struts from the fuselage supporting said aerofoil, cross wiring between opposite ends of said supporting struts to form rigid points of support for said aerofoil near its center, and diagonal struts supporting said aerofoil substantially in line with struts connecting the two first mentioned aerofoils.

HENRY B. SHIELDS.